(12) United States Patent
Bargery et al.

(10) Patent No.: US 6,910,696 B2
(45) Date of Patent: Jun. 28, 2005

(54) TRANSPORTER

(76) Inventors: Andrew Bargery, The Red House, 17 Pilton Street, Barnstaple, North Devon (GB), EX31 1PJ; Geoff Brown, Hill End, Northleigh, Goodleigh, Barnstaple, North Devon (GB), EX32 7NR; David Winton, Unit 12, Two Rivers Industrial Estate, Braunton Road, Barnstaple, North Devon (GB), EX31 1JY ( * ) Notice: Subject to any disclaimer, the term of this patent is extended or adjusted under 35 U.S.C. 154(b) by 199 days.

(21) Appl. No.: 10/194,510

(22) Filed: Jul. 12, 2002

(65) Prior Publication Data

US 2003/0015894 A1 Jan. 23, 2003

(30) Foreign Application Priority Data

Jul. 19, 2001 (GB) .............................................. 0117561

(51) Int. Cl.[7] ................................................. B62B 7/12
(52) U.S. Cl. ......................................... 280/30; 280/643
(58) Field of Search .......................... 280/30, 642, 643, 280/647, 648, 650, 47.38; 297/256.16, 130

(56) References Cited

U.S. PATENT DOCUMENTS

| 4,736,959 | A | * | 4/1988 | Van Steenburg | 280/30 |
|---|---|---|---|---|---|
| 4,878,680 | A | * | 11/1989 | Molnar | 280/30 |
| 4,902,026 | A | * | 2/1990 | Maldonado | 280/30 |
| 5,104,134 | A | * | 4/1992 | Cone | 280/30 |
| 5,188,380 | A | * | 2/1993 | Tucek | 280/30 |
| 5,431,478 | A | * | 7/1995 | Noonan | 297/130 |
| 5,474,311 | A | * | 12/1995 | Tyciak et al. | 280/30 |
| 5,478,096 | A | * | 12/1995 | Ting | 280/30 |
| 6,237,995 | B1 | * | 5/2001 | Dierickx | 297/130 |
| 6,540,292 | B2 | * | 4/2003 | Darling et al. | 297/130 |
| 2002/0060444 | A1 | * | 5/2002 | Cote | 280/648 |

* cited by examiner

*Primary Examiner*—Frank Vanaman
(74) *Attorney, Agent, or Firm*—Ira S. Dorman

(57) ABSTRACT

A transporter which can be used as an infant car seat or carrier has a body shell with a curved lower surface for use as a rocker and wheels which can be extended for use as a stroller. The wheels are carried on legs which can be retracted into opposed side cheeks by means of respective drive belts. A handle 25 is secured to inner members 55 to slide within tubular arms 23 which are pivotally secured to the side cheeks. The inner members are connected by pivotal links to the respective drive belts so that extending or retracting the handle rotates the belts to extend or retract the wheels. Release mechanisms at opposite ends of the handle 25 lock the arms in the retracted position so that the handle can be used to carry the transporter with the wheels retracted. A release handle 31 operates spring-loaded pins to lock the arms 23 in the carrying or pushing positions.

21 Claims, 9 Drawing Sheets

© TRANSPORTER

TECHNICAL FIELD OF THE INVENTION

This invention relates to a multi-function transporter. More particularly (and without limitation to the scope of the invention) the invention relates to a transporter which is relatively compact when used as a container, in storage, or when placed in a mass transportation vehicle, yet may be readily converted for carrying by means of its own handle or converted into a trolley with its own set of wheels. This specification particularly describes, by way of example, an infant seat which combines the functions of a rocker, carry cot, car seat and stroller. However, the basic principles may be adapted to, but are not limited to, a shopping trolley/basket, a golf caddy or factory parts container, for example.

BACKGROUND

Various products are currently available for transporting young children. Carry seats allow children to be safely carried on the seat of a motor vehicle, while various kinds of rocker are available for use in the home. Greater mobility is provided by folding strollers which allow children to be moved around out of doors. However, most of these devices tend to be heavy and cumbersome, and many young parents can ill-afford to buy several products which often have overlapping uses.

It is known to provide car seats with retractable wheels so that they can be converted into strollers, but generally the conversion process is difficult to achieve and cannot easily be carried out without disturbing the child.

The present invention seeks to provide a new and inventive form of transporter which has a strong but lightweight construction and can easily be adapted to perform various functions.

SUMMARY OF THE INVENTION

The present invention proposes a transporter having a carrying configuration and a mobile configuration, the transporter including:

a body shell which includes a base portion and side cheeks on opposite sides of the base portion with a body cavity within the shell;

a set of wheels which, in said carrying configuration, are retracted within said body cavity; and a handle extending between a pair of arms which are secured proximate the centres of said side cheeks and which, in said carrying configuration, are upstanding from opposite sides of the body shell for use in carrying the transporter;

in which said handle is operably coupled to the wheels such that, to convert the transporter into said mobile configuration, the handle is moved relative to the body shell causing the wheels to extend from the body cavity whereby the transporter is movably supported on the wheels.

In a preferred form of the transporter the wheels retract into the side cheeks. The wheels are preferably carried by two pairs of legs, one pair on each side. Each pair of legs is preferably secured to a drive loop, and each leg may be coupled to a slider which is secured to the drive loop and moves along a respective slideway. Although the legs may move linearly when they are extended less space is required if the legs are arranged to move angularly through fixed guides.

In a preferred form of the invention the handle is movable between extended and retracted positions. The handle may thus be coupled to the two drive loops to extend and retract the legs. In a preferred arrangement the handle is coupled to a pair of sliders which are secured to the respective drive loops and move along respective slideways. Further, the handle is preferably coupled to each slider via a respective inner member which slides within a respective tubular arm.

The invention also provides an inner member provided with a head unit having a rotatable body, and a link is pivotally connected to the rotatable body offset from its axis of rotation to move a locking pawl within the inner member such that the pawl can move from a projecting position to prevent the inner member from sliding within a tubular member to a retracted position in which the inner member is permitted to slide within the tubular member. The rotatable body may be rotated by means of a lever arm.

In a preferred arrangement the tubular arms are pivotally secured to the body of the transporter. To permit such pivotal movement when the handle is extended or retracted a link may pivotally connect each inner member to the respective slider, and locking means may be provided for fixing each tubular member in at least two alternate angular positions. For example, each locking means may include a pin which engages in a plate which is fixed with the tubular member. The pins may be retractable against spring means, e.g. by respective bell cranks moved by a common operating member.

In one use of the transporter, i.e. a seat for infants, the bottom surface of the body may lie on a convexly curved plane such that the transporter can rock back and forth when stood on a flat surface.

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
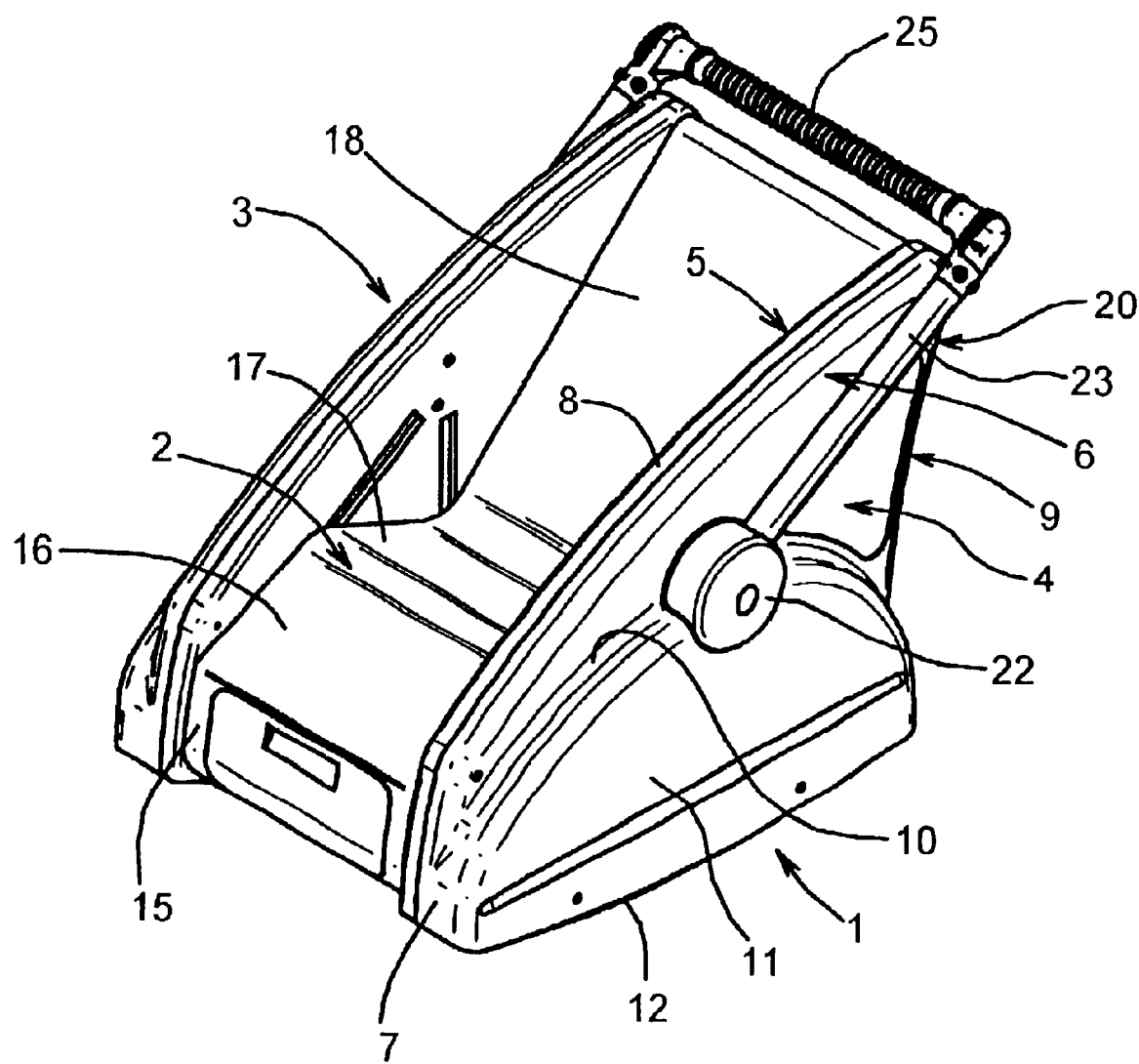
FIG. 1 is a general view of a child transporter in accordance with the invention, shown configured as a rocker or car seat.

FIG. 1 shows the transporter configured as a child rocker or car seat. The transporter has an injection moulded body shell 1 which provides a base 2 mounted between side cheeks 3 and 4. Each of the side cheeks includes spaced inner and outer side walls 5 and 6 joined by a short front wall 7 which is slightly raked in a rearward direction. A top wall 8 extends upwardly and rearwardly from the front wall 7 with a slight convex curvature to meet an angularly-disposed rear wall 9 which is forwardly inclined with a slight concave curvature. The outer walls 6 each have an arcuate outward step 10 extending from about half-way up the front wall 7 to the bottom of the rear wall 9, thereby forming cowls 11 on opposite sides of the transporter. The lower margins 12 of the side portions 3 and 4, including the cowls 11, are convexly curved from front-to-rear, allowing the transporter to rock backwards and forwards when placed on a level surface.

At the front of the transporter the base 2 commences at a short transverse wall 15 extending between the lower portions of the front walls 7, which is joined to a rearwardly-raked wall 16 forming a leg rest. The wall 16 meets a downwardly-sloping wall 17 forming a seat portion, which in turn meets a second somewhat longer rearwardly-raked wall 18 forming a back rest. The rear of the base 2 is closed by a back wall 20 (shown in FIG. 6 described below) extending between the rear walls 9 to gently curve forwards and downwards. The internal cavity which is formed within the two side cheeks 3 and 4 is at least partially open on the underside of the transporter.

Figure 2:
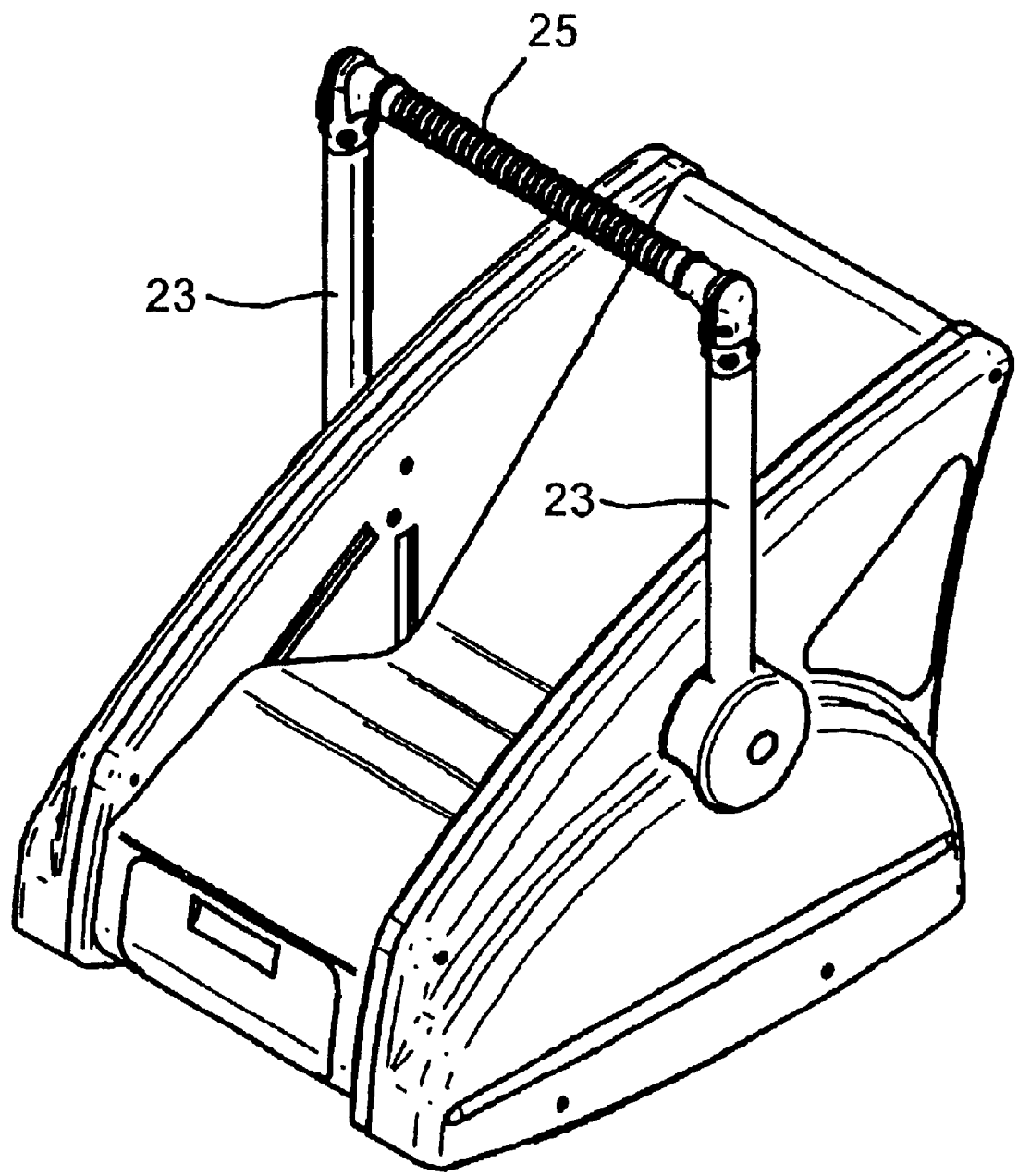
FIG. 2 is a similar view of the transporter showing how it can be adapted for carrying a child.
Figure 3:
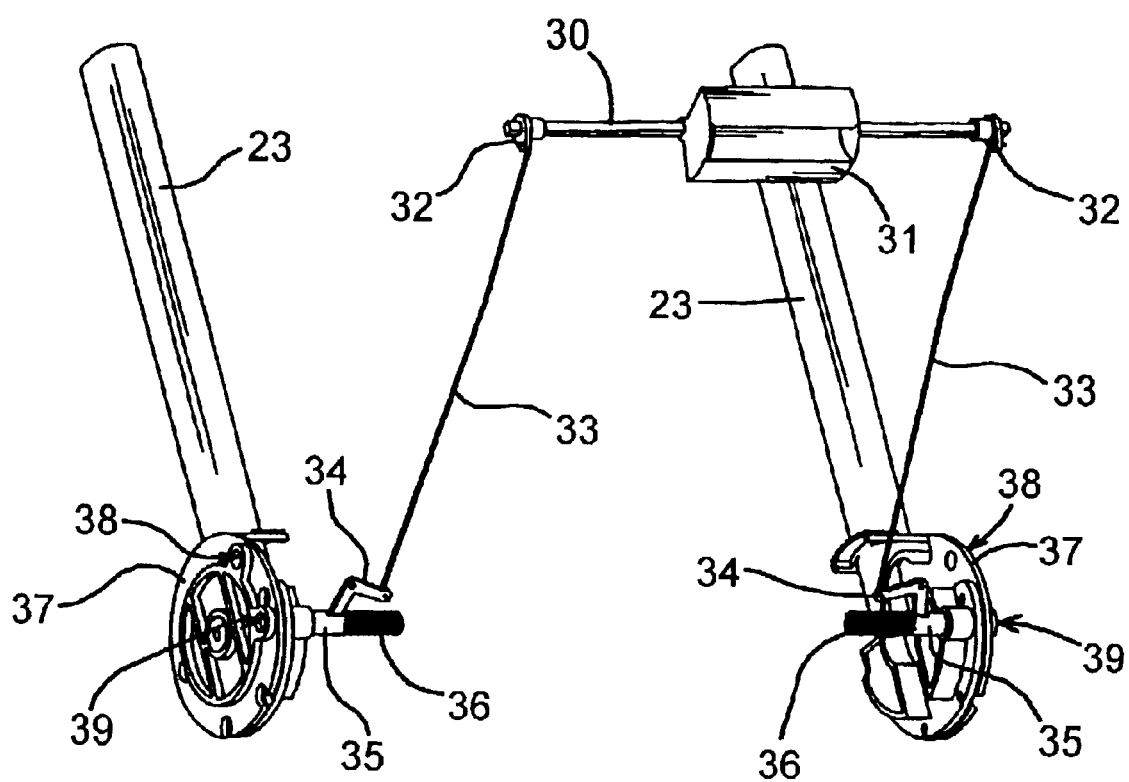
FIG. 3 is a general view of a handle locking mechanism as viewed from below at the rear of the transporter.

Hubs 22 are pivotally mounted mid-way along both outer side walls 6 for rotation about a common horizontal axis, partially recessed into the arcuate steps 10. The hubs have radially-extending tubular arms 23 which are bridged by a transverse bar-like handle 25. When configured as a rocker or car seat as in FIG. 1 the handle extends across the top of the back wall 20, as shown. However, the arms 23 can also be pivoted forwards into a generally vertical plane as shown in FIG. 2, allowing the transporter to be easily carried, e.g. to move the transporter into a motor vehicle. For safety, the handle can be locked in both positions, as follows. Referring to FIG. 3, a horizontal pivot rod 30 mounted behind the back wall 20 carries a release handle 31 which is accessible through an aperture in the back wall. Each end of the pivot rod 30 carries a short lever arm 32 which operates via a link 33 to move a bell crank 34 pivotally mounted adjacent to each hub 22. Pulling the handle 31 rotates the bell cranks to retract respective locking pins 35 against the action of compression springs 36, thereby withdrawing the pins from respective discs 37 fixed with the hubs 22. The discs contain two alternative holes 38 and 39 which receive the pins 34 to lock the handle in its two alternative rotational positions.

Figure 4:
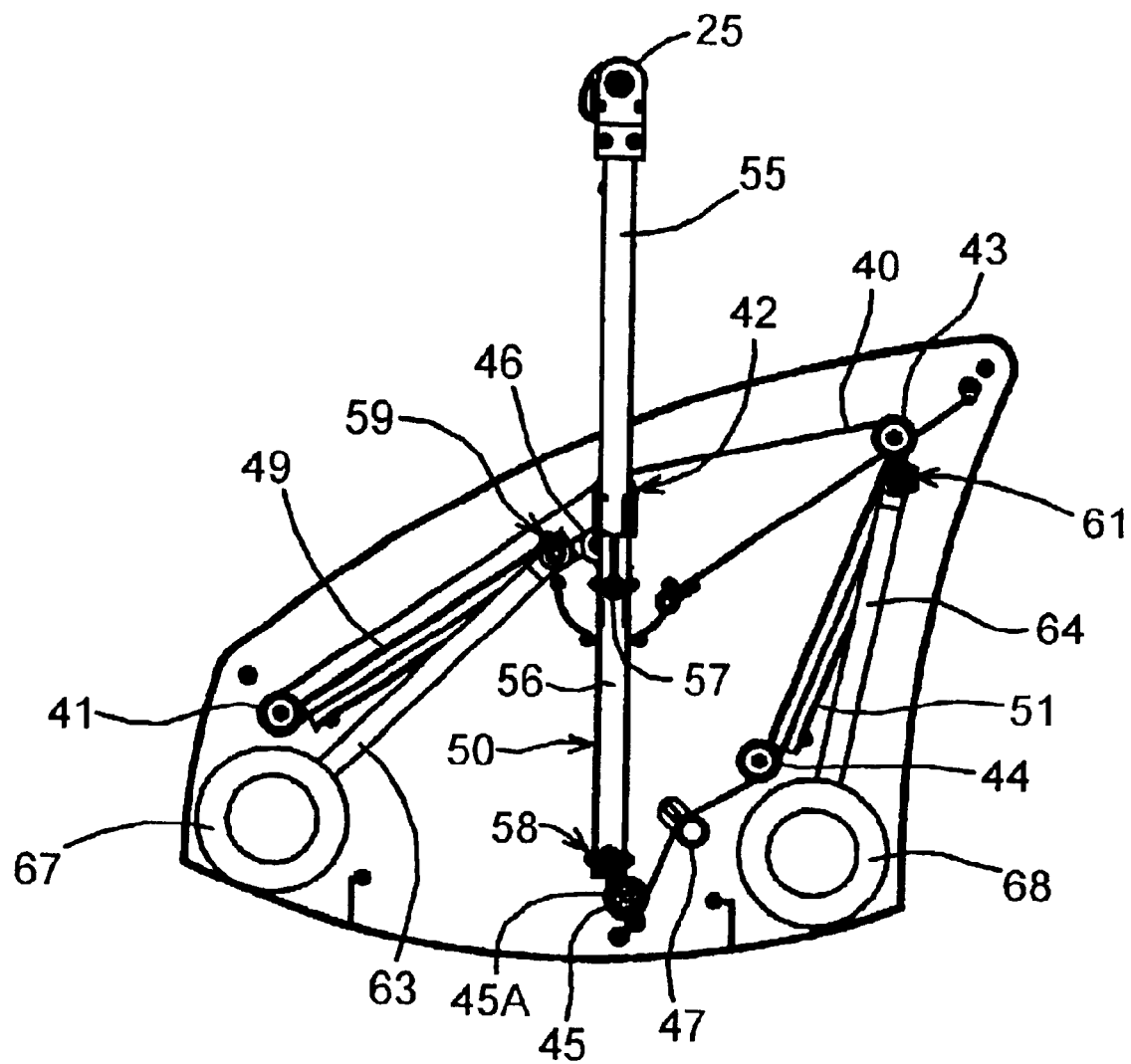
FIGS. 4 and 5 are side views of the transporter revealing some of the internal components, with wheels which are retracted and extended respectively.
Figure 5:
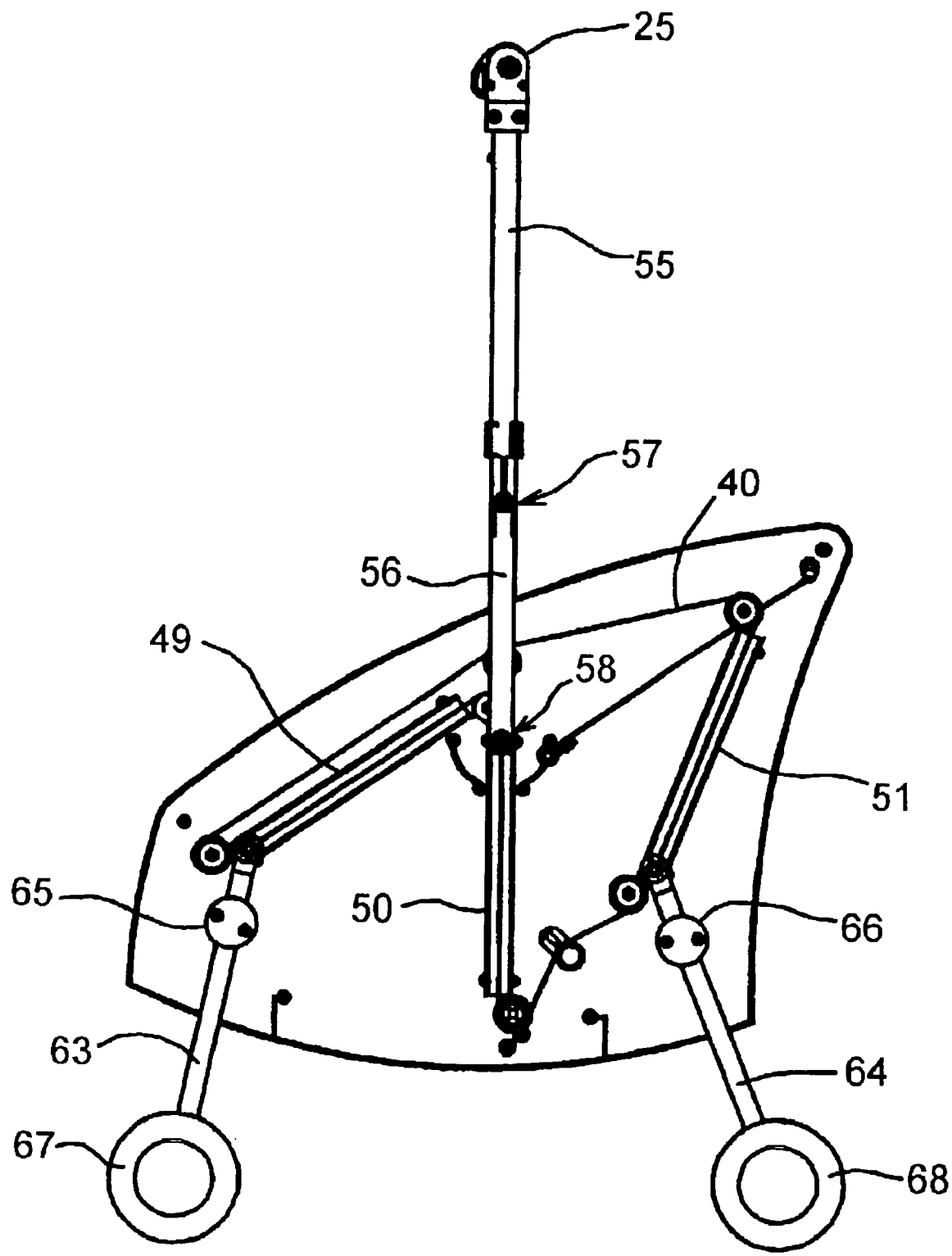
Figure 6:
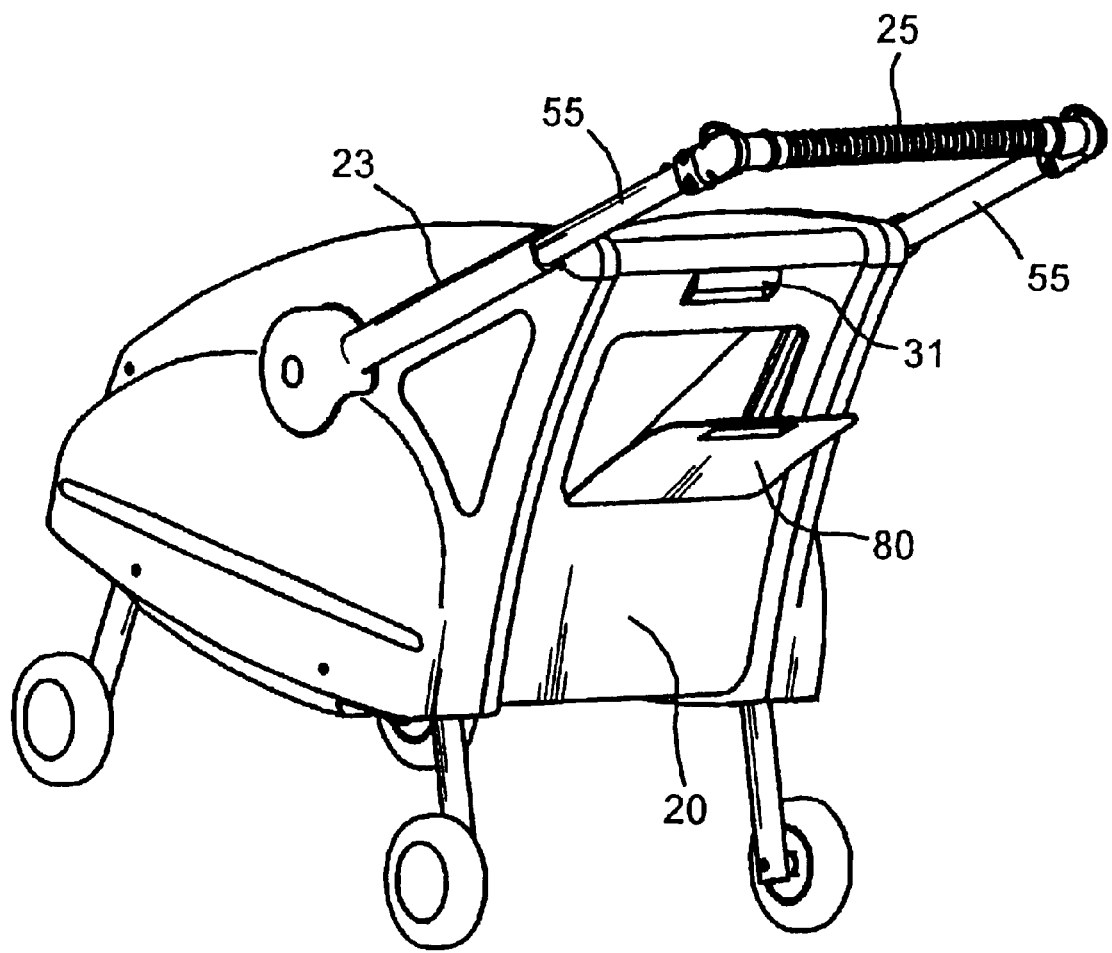
FIG. 6 is a general rear view of the transporter with the wheels extended in a stroller configuration.

When required, the transporter can also be converted into a stroller, as will now be described with reference to FIGS. 4 and 5. For purposes of illustration the outer side panel 6 has been omitted together with the hub 22 and tubular arm 23. Each of the side cheeks 3, 4 contains a flexible drive loop 40 which could take the form of a chain or cord, although in this example an inexpensive, strong and lightweight toothed belt is used in preference. The top portion of the belt is entrained around front, centre and rear pulleys pulley 41, 42 and 43 while the lower portion passes around a pair of spaced bottom pulleys 44 and 45 before passing vertically upwards in the central region to travel over a top pulley 46. An adjustable belt-tensioner 47 is slidably mounted between the bottom pulleys 44 and 45. The lower portion of the belt also passes through three channel-section slideways 49, 50 and 51. The middle slideway 50 contains the rising middle section of the belt between the pulleys 45 and 46 and intercepts the pivot axis of the hub 22. The front and rear slideways 49 and 51 are both rearwardly inclined in an upward direction, with the front slideway 49 disposed between the pulleys 41 and 46 and the rear slideway between pulleys 44 and 43. At least two of the corresponding pulleys on each side (e.g. the bottom pulleys 45) are toothed to engage the drive belts and are connected by a common shaft 45A so that movement of the two belts is synchronised. The handle 25 is joined to two inner members 55 which are telescopically and slidably received within the arms 23. The lower ends of the inner members 55 are connected to links 56 by means of pivots 57. When the inner members are fully retracted within the arms 23 as in FIG. 4, the axes of the pivots 57 are coincident with the pivot axes of the hubs 22, thereby allowing the inner members 55 to pivot with the arms 23 as described. The lower ends of the links 56 are fixed with the drive belt 40 through slide blocks 58 which are received within the middle slideway 50. Thus, by pulling the handle 25 the inner members 55 can be telescopically withdrawn from the arms 23 to the position shown in FIG. 5 which in turn causes the drive belts to rotate in a clockwise direction as viewed in the drawings. When the handle is fully extended the pivots 57 and links 56 remain within the tubular arms 23 but the pivotal connections between the links 56 and the drive blocks 58 are coincident with the pivot axis of the hubs 22 so that the arms 23 and the extended handle 25 can be rotated rearwardly and locked by means of the pins 35, as shown in FIG. 6. During extension of the handle when the pivots 57 or blocks 58 are not coincident with the hubs 22, the arms 23 cannot be rotated and remain in the upright position shown.

Returning to FIG. 4, the front and rear slideways 49 and 51 also contain respective slide blocks 59 and 61 which are fixed with the belt 40 and pivotally secured to the upper ends of front and rear legs 63 and 64. The legs pass slidably and angularly through fixed guides 65 and 66 (FIG. 5) and have respective wheels 67 and 68 mounted at their lower ends. When the handle is retracted as in FIG. 4 the wheels are completely enclosed within the side cheeks 3 and 4. However, as the handle is extended causing the drive belt 40 to rotate as described, the slide blocks move forwardly and downwardly along the slideways 49 and 51 causing the legs to extend downwardly as shown in FIGS. 5 and 6.

It will thus be appreciated that the extension of the legs is assisted by gravity, since the weight of the transporter and its contents acts in direct opposition to the upward movement of the handle 25. To further assist the extension of the wheels a co-axial torsion spring may be fitted to the shaft 45A so that the wheels are spring-loaded to their extended position.

It will be appreciated that when the arms 23 are secured in the rearward position by means of the locking pins 35 as in FIG. 6 the extended handle 25 can be used for pushing the transporter in the manner of a conventional stroller. Furthermore, since the axis of the arms 23 is no longer aligned with the middle slideways 50 the blocks 58 cannot enter the slideways and the inner members 55 cannot therefore slide into the arms 23. Thus, the belts 40 are unable to rotate so that the wheels remain fixed in their extended positions.

Retraction of the wheels is achieved by releasing the arms 23 using the handle 31, rotating the arms to an upright position and then pushing the handle downwards to retract the inner members and thereby rotate the belts counter-clockwise as shown.

Figure 7:
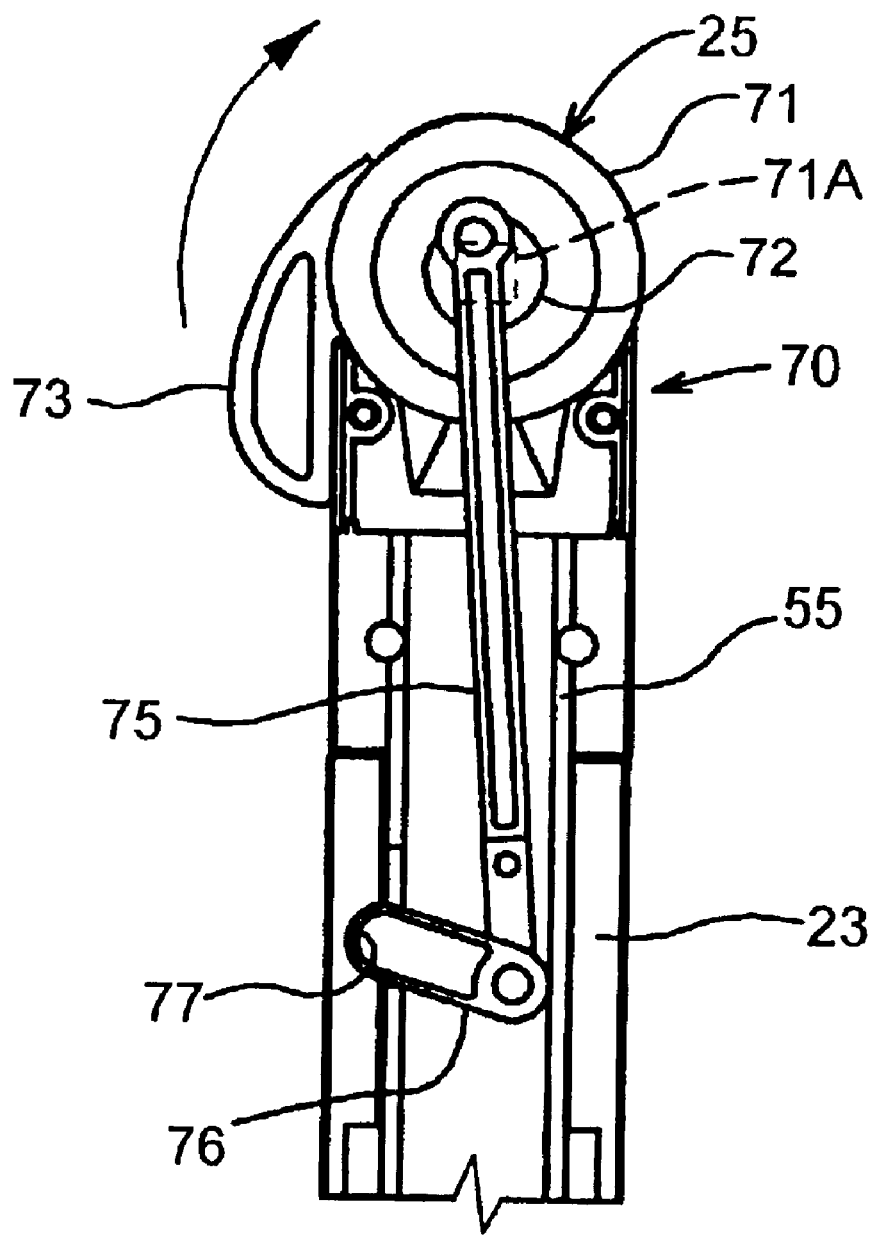
FIGS. 7 to 9 are sectional side elevations showing a detail of the handle release mechanism of the transporter.
Figure 8:
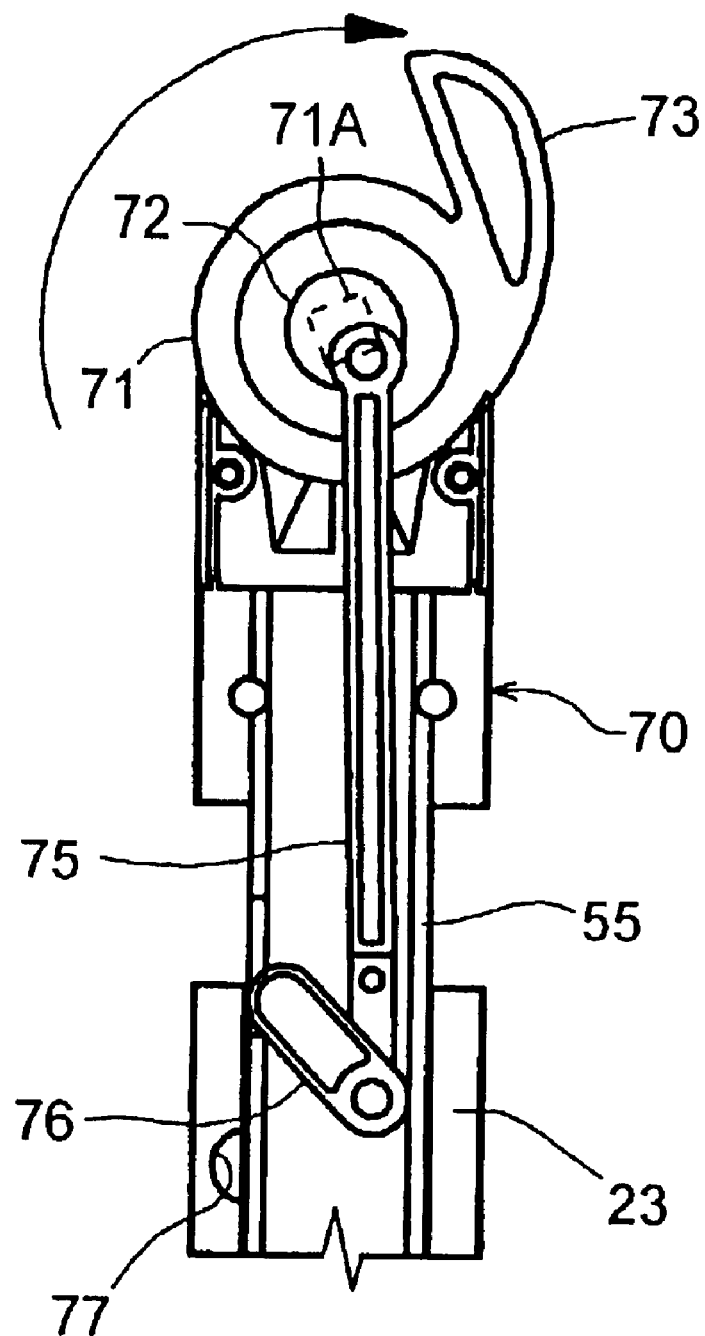
Figure 9:
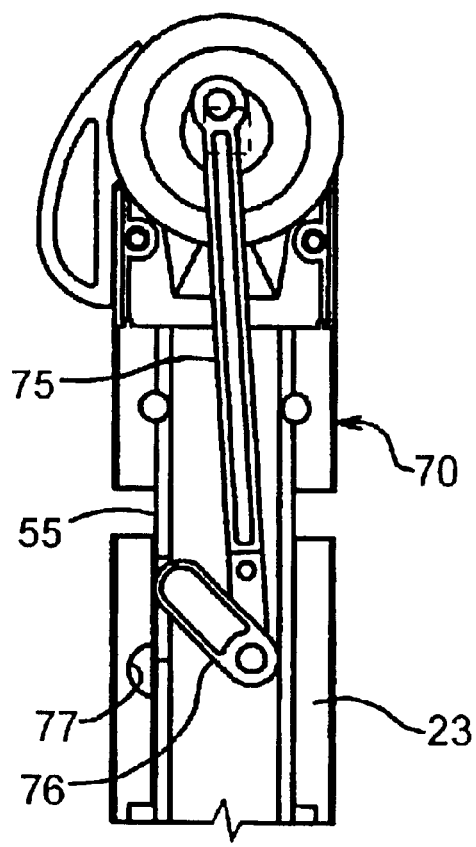

When the handle is retracted it is necessary to prevent the handle from extending when the transporter is lifted by the handle to carry the transporter in the carry seat configuration (FIG. 2). Spring-loaded buttons or similar means could be used, but a preferred way of achieving this is shown in FIGS. 7 to 9. Each end of the handle 25 is provided with a head unit 70 which connects the handle to the respective inner member 55. Each head unit includes a short cylindrical rotatable body 71 having a co-axial spigot 72 which is rotatably received in each end of the handle 25. The rotatable bodies 71 are connected by a common spindle 71A so that rotation of either one will also rotate the other, and they are also spring loaded to return to the position shown in FIG. 7. Both of the bodies 71 are provided with a tangentially-extending release lever 73 configured to lie against the depending side of the unit 70, and a drop link 75 is pivotally connected to each body 71, offset from its axis of rotation, contained within the inner member 55. A pawl 76 is pivotally secured to the lower end of each drop link 75 to project upwards and outwards through a cutout in the wall of the inner member 55 and engage in a corresponding notch 77 in the wall of the arm 23 as shown in FIG. 7. The pawl is spring loaded in an anti-clockwise direction as viewed in the drawing so that it rests against the lower edge of the cutout in the inner member 55 but can be rotated against the action of the spring to retract into the inner member. The pawl thus prevents the two sections from telescoping until the lever 73 is pulled upwardly in the direction of the arrow, which causes the body 71 to rotate and urge the drop link 75 in a downward direction, which in turn moves the pawl out of the notch 77 as shown in FIG. 8, allowing the inner members 55 to extend. Thus, by grasping the handle 25 and pulling the lever 73 upwards against the weight of the transporter body and its contents, the extension of the wheels can be accomplished with a very simple gravity-assisted action. Once the pawl has left the notch 77 the release lever 73 can be returned to the starting position as shown in FIG. 9. Upon pushing the handle 23 downwards to retract the wheels the arm 23 contacts the pawl 76 and rotates it clockwise until the pawl clicks into the notch 77 thus securing the handle in the retracted position. Although two pawls are provided for maximum safety it will be appreciated that only one pawl and drop link are necessary to lock the arms in their retracted positions. Furthermore, since the two bodies 71 rotate together due to the connecting spindle 71A only one of the bodies need be provided with a tangential release lever 73, but by providing both bodies with such a lever the transporter is suitable for left and right handed use.

Unused space within the body of the transporter may conveniently be used for storage, accessible through a door 80 in the back wall 20 as shown in FIG. 6. A similar door may also be provided in the transverse front wall 15 providing access to a smaller storage compartment.

Figure 10:
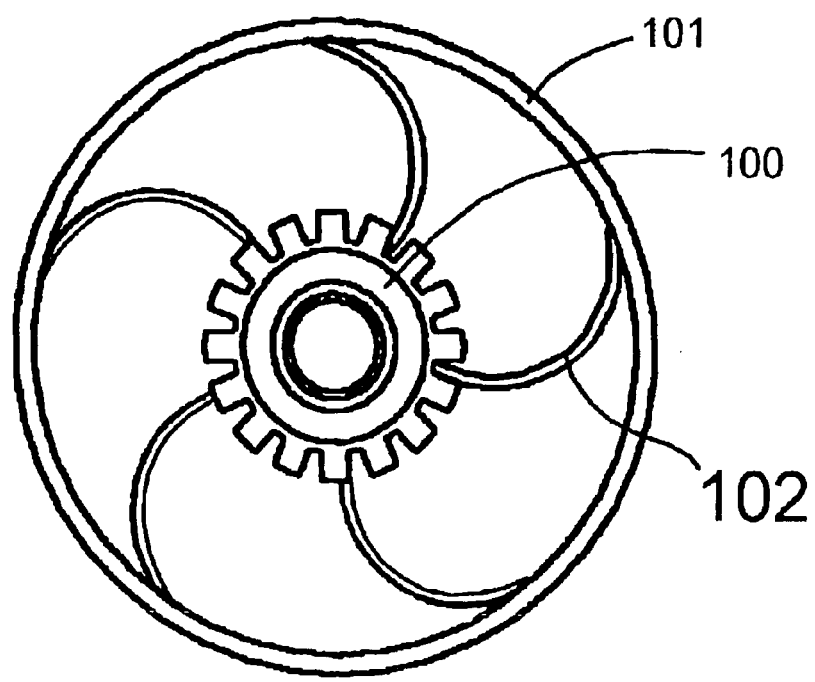
FIG. 10 is a side elevational view of a self-sprung wheel for use with the transporter.

It will be apparent that modifications and additions which are not fully described herein are possible. For example, the wheels 67, 68 can be mounted to have a castor action and a braking mechanism may also be included. For additional comfort the wheels could be spring loaded, as shown in FIG. 10 for example. The sprung wheel has an inner wheel hub 100 and a co-axial cylindrical rim 101 which are connected by a number of arcuate spoke-like arms 102 which radiate outwardly from the hub in a spiral manner. The arms 102 are able to resiliently flex to permit radial movement of the rim 101.

The transporter is thus versatile, robust, lightweight and easy to move, and provides an all-in-one solution to the task of child transportation.

It will be appreciated that the features disclosed herein may be present in any feasible combination. Whilst the above description lays emphasis on those areas which, in combination, are believed to be new, protection is claimed for any inventive combination of the features disclosed herein.

What is claimed is:

1. A transporter having a carrying configuration and a mobile configuration, the transporter including:
    a body shell which includes a base portion and side cheeks on opposite sides of the base portions with a body cavity within the shell;
    two pairs of legs, one pair of said legs being disposed on each side of the transporter;
    a set of four wheels carried by said two pairs of legs which, in said carrying configuration, are retracted into said side cheeks of said body shell;
    two drive loops, one of said drive loops being disposed on each side of the transporter;
    a respective slider, to which each of said legs is coupled, secured to one of said drive loops;
    a respective slideway along which each of said sliders moves;
    a pair of arms, which are secured proximate the centres of said side cheeks and which, in said carrying configuration, are upstanding from opposite sides of the body shell for use in carrying the transporter; and
    a handle extending between said pair of arms and operably coupled to said drive loops and the wheels, said coupling being so constructed and arranged that, in converting the transporter into said mobile configuration, the handle is moved relative to the body shell to thereby cause the wheels to extend from the body shell whereby, the transporter is movably supported on the wheels.

2. A transporter according to claim 1, in which the legs move angularly through fixed guides.

3. A transporter according to claim 1, in which the handle is coupled to a pair of sliders which are secured to the respective drive loops and move along respective slideways.

4. A transporter according to 3, in which said arms are of tubular form and the handle is coupled to each slider via a respective inner member which slides within a respective arm.

5. A transporter according to claim 4, in which a link is pivotally connected between each inner member and the respective slider.

6. A transporter according to claim 4, in which locking means is provided for fixing each tubular arm in at least two alternate angular positions.

7. A transporter according to claim 6, in which each locking means includes a pin which engages in a plate which is fixed with the tubular arm.

8. A transporter according to claim 7, n which each pin is retractable against spring means.

9. A transporter according to claim 8, in which the pins are retracted by respective bell cranks moved by a common operating member.

10. A transporter according to claim 4, in which manually-operable means is provided to prevent the inner member from sliding within the respective arm until said manually-operable means is released.

11. A transporter according to claim 10, in which at least one of the inner members is provided with a head unit having a rotatable body, and a link is pivotally connected to the rotatable body offset from its axis of rotation to move a locking pawl within the inner member such that the pawl can move from a projecting position to prevent the inner member from sliding within the tubular arm to a retracted position in which the inner member is permitted to slide within the tubular arm.

12. A transporter according to claim 11, in which the rotatable body is provided with a lever arm for rotation thereof.

13. A convertible transporter having a carrying configuration and a mobile configuration, the transporter including:
    a set of wheels;
    body shell which includes a base portion and side cheeks on opposite sides of the base portion, said body shell forming cavities into which said wheels are retracted in said carrying configuration;

a pair of arms which, in said mobile configuration, project rearwardly from opposite sides of said transporter;

a handle extending between said pair of arms, such that said handle can be used for pushing the transporter; and an operable coupling between said handle and said wheels so constructed and arranged that, in converting the transporter into said mobile configuration from said carrying configuration, said handle slides away from said body shell, to an extended position, and said wheels extend from said cavities such that said transporter is movably supported on said wheels; wherein said arms are pivotally secured proximate the centres of said side cheeks such that said arms can be rotated from a rearwardly-projecting pushing position to an upright carrying position, enabling said handle to be used for pushing the transporter in said mobile configuration and also for carrying said transporter in said carrying configuration; and said operable coupling between said handle and said wheels, so constructed and arranged, being effective only when said arms are in said upright carrying position, such that transformation from said carrying configuration to said mobile configuration is brought about by sliding the handle upwardly away from said body shell, with said arms in said upright carrying position, and then rotating said arms to said rearwardly-projecting pushing position.

14. A transporter according to claim 13, in which there are four wheels carried by two pairs of legs, one pair on each side of the transporter.

15. A transporter according to claim 14 additionally including a pair of drive loops to which the handle is operably coupled, each of said pairs of legs being secured to one of said drive loops.

16. A transporter according to claim 15 additionally including a plurality of sliders, said less being coupled to said sliders, and each of said sliders being in turn secured to a respective drive loop and moving along a respective slideway.

17. A transporter according to claim 13, in which the bottom surface of the transporter body lies on a convexly curved plane such that the transporter can rock back and forth when stood on a flat surface.

18. A transporter according to claim 13, in which locking means is provided for fixing each arm in said rearwardly projecting pushing position and said upright carrying position.

19. A transporter according to claim 18, in which each locking means includes a pin which engages in a plate which is fixed with the respective arm.

20. A transporter according to claim 19, in which the pin is retractable against spring means.

21. A transporter according to claim 20, in which the pins are retracted by respective bell cranks moved by a common operating member.

* * * * *